United States Patent
Liu

(10) Patent No.: US 7,254,186 B2
(45) Date of Patent: Aug. 7, 2007

(54) ELECTROMAGNETIC WAVE TRANSMITTER, RECEIVER AND TRANSCEIVER SYSTEMS, METHODS AND ARTICLES OF MANUFACTURE

(75) Inventor: Frank Liu, Princeton, NJ (US)

(73) Assignee: M/A-Com, Inc., Lowell, MA (US)

( * ) Notice: Subject to any disclaimer, the term of this patent is extended or adjusted under 35 U.S.C. 154(b) by 772 days.

(21) Appl. No.: 10/624,312

(22) Filed: Jul. 22, 2003

(65) Prior Publication Data

US 2005/0018790 A1 Jan. 27, 2005

(51) Int. Cl.
*H03K 9/00* (2006.01)
(52) U.S. Cl. .................................................. 375/316
(58) Field of Classification Search ................ 375/316, 375/295, 329, 335; 370/320, 328
See application file for complete search history.

(56) References Cited

U.S. PATENT DOCUMENTS

| | | | |
|---|---|---|---|
| 4,584,541 A | 4/1986 | Nossen | 332/16 R |
| 5,249,201 A | 9/1993 | Posner et al. | 375/59 |
| 5,418,818 A | 5/1995 | Marchetto et al. | 375/264 |
| 5,490,172 A | 2/1996 | Komara | 375/296 |
| 5,524,286 A | 6/1996 | Chiesa et al. | 455/126 |
| 5,812,607 A | 9/1998 | Hutchinson, IV et al. | 375/322 |
| 6,389,078 B1 | 5/2002 | Hessel et al. | 375/259 |
| 6,411,655 B1 | 6/2002 | Holden et al. | 375/269 |
| 6,653,909 B2 | 11/2003 | Nielsen | 332/151 |
| 6,834,084 B2* | 12/2004 | Hietala | 375/296 |
| 7,039,130 B2* | 5/2006 | Hurley | 375/326 |
| 2004/0192229 A1 | 9/2004 | Morris et al. | 455/91 |
| 2004/0247040 A1* | 12/2004 | Dennis et al. | 375/295 |

OTHER PUBLICATIONS

Vanderaar M et al. "Transmit pulse shaping filters and CORDIC algorithm based precompensation for digital satellite communications" Aug. 18-21, 1996, vol. 3, 1996, pp. 1219-1222, XP002159076.
Weste N et al. "Broadband U-NII wireless data" Jan. 4, 1998, pp. 72-77 XP010263408.
Volder J E "The Cordic Trigonometric Computing Technique", vol. EC-8, No. 3, Sep. 1959 pp. 330-334, XP000565555.
Ken Turkowski, "Fixed-Point Trigonometry with CORDIC Iterations", Jan. 17, 1990, pp. 1-5.
U. Meyer-Base, A. Meyer-Base, W. Hilberg, "Coordinate Rotation Digital Computer (CORDIC) Synthesis for FPGA", 4th International Workshop on Field Programmable Logic and Applications, FPL'94, Sep. 7-9, 1994, Prag, Czech Republic, pp. 397-408.
Richard Herveille, "Cordic Core Specification", www.opencores.org, Rev. 0.4, Dec. 18, 2001.

* cited by examiner

*Primary Examiner*—Khai Tran

(57) ABSTRACT

The invention is directed to a system for processing an electromagnetic wave by receiving rectangular coordinate information for the electromagnetic wave; and directly converting the rectangular coordinate information into a magnitude signal, a $\sin(\Phi)$, and a $\cos(\Phi)$ signal using a CORDIC algorithm, where $\Phi$ represents a phase of the electromagnetic wave. The direct converting my be accomplished using shift and add/subtract operations in a processor and a look-up table, or by using at least two cascaded processors employing the CORDIC algorithm.

20 Claims, 9 Drawing Sheets

ELECTROMAGNETIC WAVE TRANSMITTER, RECEIVER AND TRANSCEIVER SYSTEMS, METHODS AND ARTICLES OF MANUFACTURE

FIELD OF THE INVENTION

The invention relates to the transfer of electromagnetic waves. More particularly, the invention relates to a system for processing electromagnetic signals, and more particularly to processing electromagnetic waves using a rectangular to polar conversion.

BACKGROUND OF THE INVENTION

Electromagnetic waves may be transferred from place to place through a conductor. In wired transmission, the conductor is usually a wire or other solid substance. In wireless transmission, the conductor is usually an ambient substance, such as air, water, etc. In wireless connections a transmitter is usually used to transfer a wave and a receiver to receive a wave. A transceiver combines the functions of both transmitter and receiver in one system. A transmitter typically converts electrical energy into a signal, which is then broadcast via an antenna to a receiver's antenna. Repeaters, middle stations, etc. may be used as intermediates in the transmission to sustain the integrity of the transmitted wave.

The electrical energy input into a transmitter usually is modulated into a basic transmission or carrier signal by overlaying some intelligence upon the energy—speech, data, etc.—in the form of an information signal, and the receiver typically demodulates the modulated carrier signal, once received, into a copy of the initial intelligence sent by the transmitter.

In order to accomplish their function, transmitters and receivers are comprised of various building block components. The information signal, for example, may be generated or modulated by one or more transducers, such as a microphone. It may also be generated by a modulator, such as an analog modem. The modulation of the information signal onto the carrier signal may be done by a mixer and the energy or carrier wave itself is usually generated by an oscillator. An amplifier is usually used at one or more places in the transmitter circuitry to boost the signal strength, to provide power to active components, etc. Similarly, one or more filters are usually used as well, to clean up the input signal, the outputted signal, etc. An antenna is used to broadcast the signal, and a power supply will supply power as needed.

The components of a receiver are similar, and indeed, as noted above, transceivers combine both transmitters and receivers. In a transceiver, separate components may be used for the transmitter and receiver, or, one or more devices providing for switching are used to turn on respective transmitter and receiver components as needed.

Various techniques may be used to actually transfer the intelligence. For example, electromagnetic waves representing the information signal in wireless transmission are modulated into carrier signals by varying wave characteristics such as amplitude, frequency and phase, in an analog or digital manner. During this process, one or more aspects of the electromagnetic wave may be represented as one or more coordinates on a graph, which describe that aspect. For example, aspects of an electromagnetic signal wave may be calculated using rectangular coordinates representative of the in-phase and quadrature phase components of the signal, known as I,Q data. This I,Q data may be used to process the signal wave.

In many systems used for processing electromagnetic waves, however, it may be advantageous to use a polar representation of aspects of the electromagnetic wave instead of rectangular coordinates. Because of drawbacks in conventional systems, it would be desirable to provide more efficient and precise methods and articles of manufacture processing electromagnetic waves in this manner.

SUMMARY OF THE INVENTION

The invention comprises systems, methods and articles of manufacture for transmitting and receiving electromagnetic waves and signals. Embodiments of the invention may include a system for processing an electromagnetic wave by receiving rectangular coordinate information for the electromagnetic wave; and directly converting the rectangular coordinate information into a magnitude signal, a $\sin(\Phi)$, and a $\cos(\Phi)$ signal using a CORDIC algorithm, where $\Phi$ represents a phase of the electromagnetic wave. The direct converting my be accomplished using shift and add/subtract operations in a processor and a look-up table, or by using at least two cascaded processors employing the CORDIC algorithm.

BRIEF DESCRIPTION OF THE DRAWINGS

For the purpose of illustrating the invention, there is shown in the drawings at least one embodiment, which is presently preferred; it being understood, however, that this invention is not limited to the precise arrangements, methods and instrumentalities shown.

DETAILED DESCRIPTION OF THE INVENTION

Figure 1A:
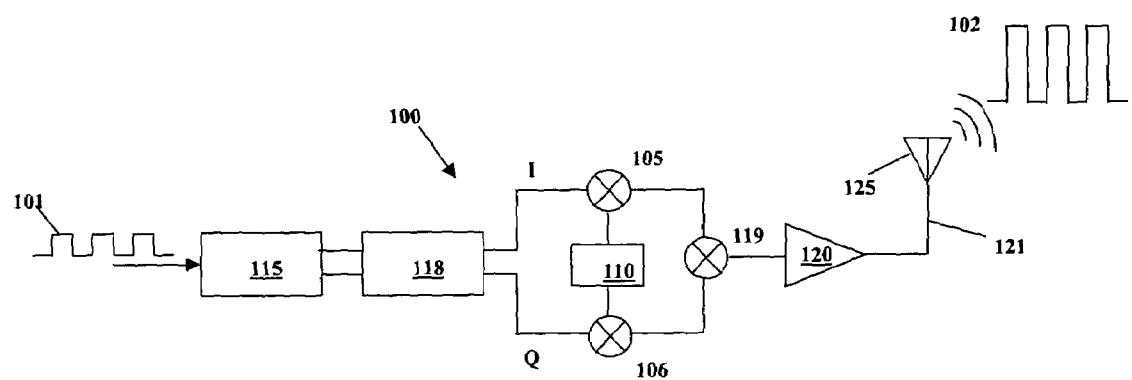
FIGS. 1(a)-(c) show systems for processing an electromagnetic wave.

Embodiments of the invention include apparatus, methods and articles of manufacture for processing electromagnetic wave, such as for transmitting and receiving information signals. It should be noted that the word "signal" is used herein to describe an electromagnetic wave that has been modulated in some fashion, usually by the impression of intelligence upon the wave, for example imposing data upon a carrier wave. It should also be noted that the use of "signal" and "wave" in the singular includes the plural (or multiple signals and waves respectively) as often systems for processing electromagnetic waves, such as transmitters, receivers and transceivers, generate more than one signal and/or wave in the normal course of their operation. For example, multiple harmonics of a baseband signal might be desirably generated as in amplitude modulation; multiple frequencies might be generated, etc.

Embodiments of the invention may be entirely comprised of hardware, software and/or may be a combination of software and hardware. Accordingly, individual blocks and combinations of blocks in the drawings support combinations of means for performing the specified functions and/or combinations of steps for performing the specified functions. Each of the blocks of the drawings, and combinations of blocks of the drawings, may be embodied in many different ways, as is well known to those of skill in the art.

FIG. 1(a) shows one embodiment of a general transmitter 100 for receiving an input wave 101 and transmitting an output signal 102 using a quadrature based modulation scheme. While described herein in terms of a transmitter, those of ordinary skill in the art will appreciate that the invention may also be used for receivers, transceivers, and other wave processing systems as well.

Turning to FIG. 1(a), an input wave 101 may consist of varying types of intelligence, e.g., voice, data, etc. The input wave 101 may be analog or digital, and is not limited. Similarly the transmitted output signal 102 may consist of various types of intelligence modulated onto a carrier wave, e.g. voice, data, etc. While the output signal may be analog, a digital output signal may be constructed as well and the invention is not limited.

It should be noted that the word "signal" is used herein to describe an electromagnetic wave that has been modulated in some fashion, usually by the impression of intelligence upon the wave, for example imposing data upon a carrier wave. It should also be noted that the use of "signal" and "wave" in the singular includes the plural (or multiple signals and waves respectively) as often transmitters, receivers and transceivers generate more than one signal and/or wave in the normal course of their operation. For example, multiple harmonics of the baseband might be desirably generated as in amplitude modulation; multiple frequencies might be generated, etc. It should also be noted that embodiments of the invention might be used as well to input and/or output waves, as well as signals, as is further described below.

Transmitter 100 may comprise a baseband processor 115, signal processor 118, mixers 105 and 106, a carrier wave source 110, a combiner 119, an amplifier system 120, load line 121, and an antenna 125. A baseband input wave 101 may be inputted into baseband processor 115, which may generate I and Q data signals (analog or digital) representative of input wave 101. A signal processor 118 may be used to further process the I and Q signals, such as correcting the signals for non-linearities produced in power amplifier 120 or to filter unwanted frequency components from the signal. The I and Q signals may then pass to mixer 105 and 106 along separate channels I and Q respectively. Each of the I and Q data signals may then be mixed with a carrier wave generated by carrier wave source 110. The signal may then be recombined at combiner 119 and fed into amplifier 120. Amplifier system 120 may be used to drive antenna 125 through load line 121 using the recombined modulated carrier signal, from which the output signal 102 may be transmitted. Output signal 102 may represent an amplified version of input wave 101, modulated onto the carrier wave provided by carrier wave source 110.

Figure 1B:
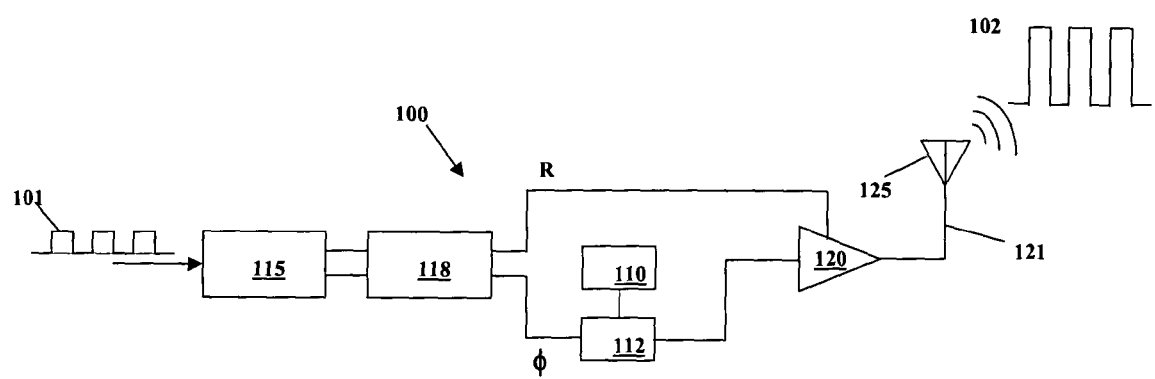

FIG. 1(b) illustrates one embodiment of a general transmitter used to receive an input wave 101 and generate an output signal using a polar based modulation scheme. In the embodiment shown in FIG. 1(b), input wave 101 may be received by baseband processor 115, which generate signals representing the amplitude (R) and phase ($\Phi$) of input wave 101, which may be analog or digital signals. This is often accomplished by a digital signal processor utilizing one or more shift-add algorithms, such as by using a CORDIC (i.e., COordinate Rotation DIgital Computer) for rotating vectors in a plane. The phase portion of the signal, $\phi$, may then be passed to a modulator 112, where it is used to modulate a carrier wave from carrier wave source 110.

This modulated carrier signal, which typically has a substantially constant envelope, may then be inputted to amplifier system 120. The gain or level of amplification of the modulated carrier wave signal by amplifier system 120 may be controlled by the amplitude signal (R) in order to use amplifier system 120 to drive antenna 125 through load line 121 with an output signal 102, which is an amplified version of input wave 101 modulated onto the carrier wave. This may be accomplished, for example, by using individual bits of a digital word representing the amplitude portion of input wave 101 to control individual power amplifiers or segments within amplifier system 120, each of which receives the modulated carrier wave signal.

Figure 1C:
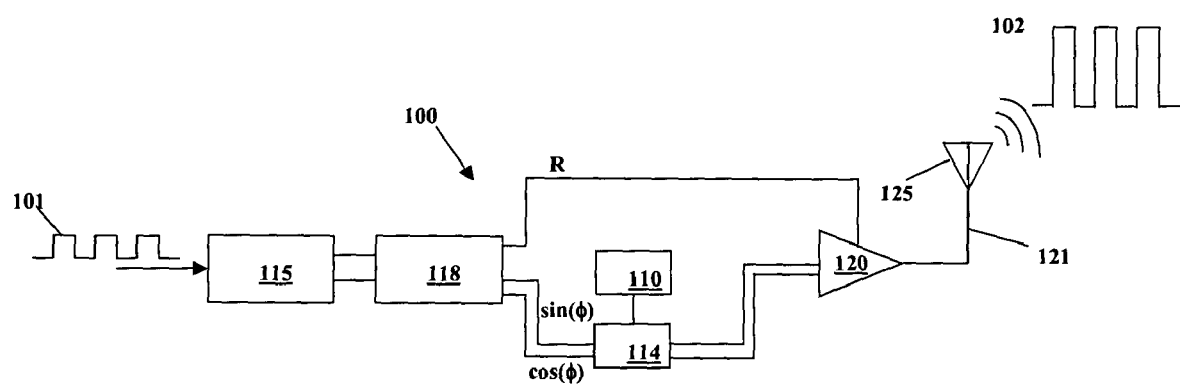

FIG. 1(c) illustrates one embodiment of a general transmitter that may be used to generate an output signal using the system of the invention. In the embodiment shown in FIG. 1(c), an input wave 101 may be received by baseband processor 115, where it may be converted into a number of signals, which, when combined represent input wave 101. In this example, magnitude (R), sin($\Phi$), and cos($\Phi$) data signals may be used. This is described in more detail below.

As with the previously described embodiments, additional signal processing may or may not be performed by signal processor 118. Thereafter, a signal containing a characteristic of the signals representing input wave 101, such as the sin($\Phi$) and cos($\Phi$) signals, may be passed to a modulator 114, where this aspect of the signals representing input wave 101 may be used to modulate a carrier wave from a carrier wave source 110 to produce one or more modulated carrier wave signals.

The modulated carrier wave signal(s) may then be passed to amplifier system 120. It would be advantageous for modulated carrier wave signal(s) to have a substantially constant envelope in order to utilize non-linear amplification systems in amplifier 120. Those of ordinary skill in the art will appreciate that the amplifier may comprise any components or circuitry capable of amplifying an electromagnetic wave, such as one or more power amplifiers or transistor segments forming an segmented amplifier (SA), etc.

Another characteristic of the signals representing input wave 101, such as the magnitude of an signal (R), may be passed to amplifier 120 to control the gain or amplification of the modulated carrier wave signal(s). Examples ways to accomplish this are described in more detail below. Amplifier 120 may thus be used to drive antenna 125 through load line 121 with an output signal 102 that is an amplified version of input wave 101 modulated onto a carrier wave signal.

Figure 2:
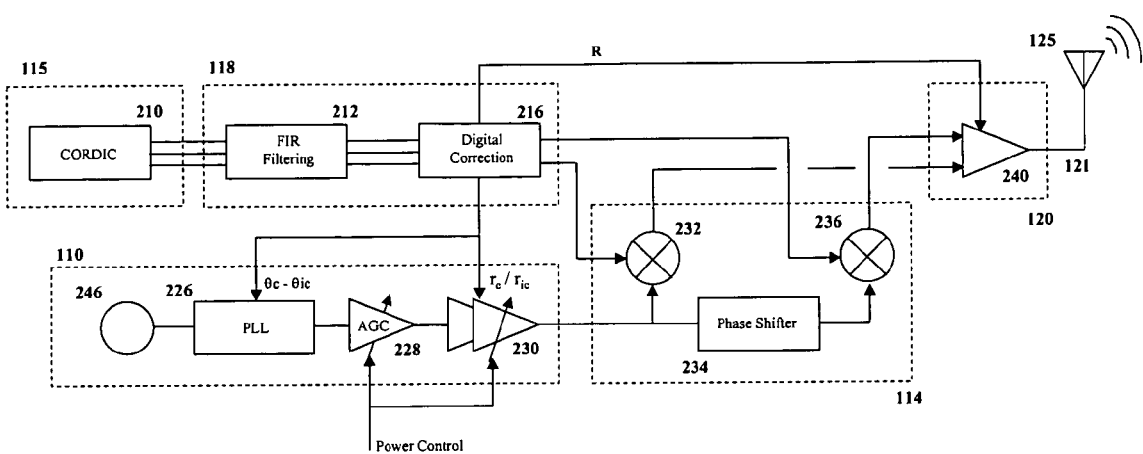
FIG. 2 shows an embodiment of a transmitter.

A further embodiment is shown in FIG. 2. As shown in FIG. 2, baseband processor 115 may include a controller 210 that may receive an input wave and generate signals representing the input wave, such as the aforementioned R, sin($\Phi$), and cos($\Phi$) signals. This may be accomplished in a number of ways. In one embodiment, processor 115 may incorporate a digital signal processor utilizing one or more shift-add algorithms, such as by using a CORDIC (i.e., COordinate Rotation DIgital Computer) for rotating vectors in a plane. The program performs a conversion of the rectangular I,Q vector data into polar form by iterating input values using a series of specific incremental rotation angles selected so that each is performed by a shift and add operation. Rotation of unit vectors enables the system to accurately compute trig functions, and to compute the magnitude and phase angle of an input vector. This generates a set of polar coordinates from the rectangular coordinates present in the I,Q vector data.

In one embodiment of the invention, a rectangular vector for I, Q data, {I, Q}, which represents one or more aspects of the input wave being processed, may be converted into a polar vector {mag, cos(Φ), sin(Φ)}. There are a number of ways that the {I, Q} vector may be converted to the polar vector {mag, cos(Φ), sin(Φ)}.

Figure 3A:
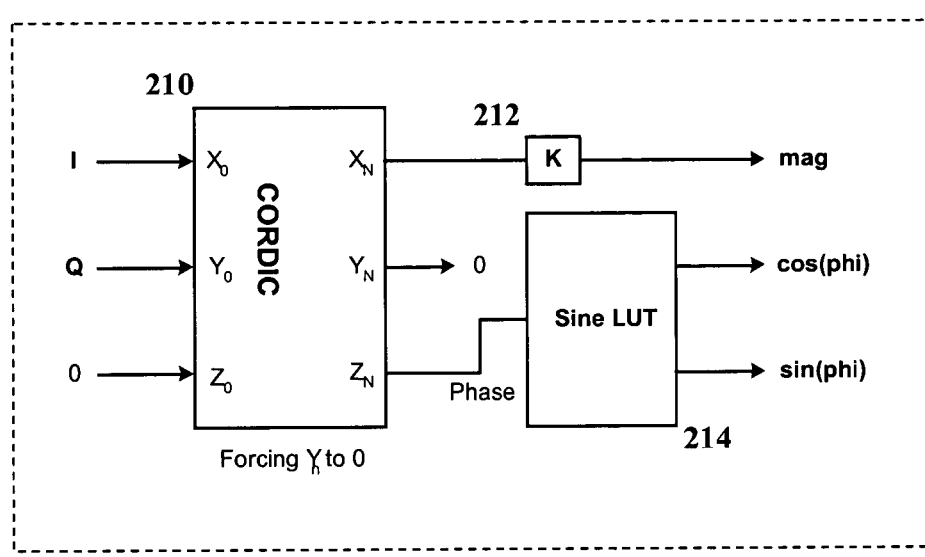
FIGS. 3(a)-(c) show embodiments of a baseband processor.

One implementation of this is illustrated in FIG. 3(a). As shown in FIG. 3, processor 115 may contain a logic processor 310, which is programmed with a CORDIC based algorithm.

A CORDIC algorithm operating in signal processor 310 may be used to convert {I, Q} to {mag, Φ} by forcing Yn to zero. This may be accomplished, for example, using the CORDIC iterations represented by equations 1 and 2 below:

$$\begin{bmatrix} X_{n+1} \\ Y_{n+1} \end{bmatrix} = \begin{bmatrix} 1 & \mu(n)2^{-n} \\ -\mu(n)2^{-n} & 1 \end{bmatrix} \begin{bmatrix} X_n \\ Y_n \end{bmatrix} \quad \text{Eq. 1}$$

$$Z_{n+1} = Z_n + \mu(n)\arctan\left(\frac{1}{2^n}\right) \quad \text{Eq. 2}$$

where the number of iterations, n, varies from 0 to N−1.

The forward/reverse circular transformations used by processor 115 may differ in pre-processing, post-processing, or the sign variable μ(n). For example, in order to convert {I,Q} to {mag, Φ}, the input values of $X_0$, $Y_0$, and $Z_0$ to logic processor 310 may be designated during a preprocessing stage as $Z_0=0$; $X_0=I$; $Y_0=Q$. Also during this preprocessing, if $X_0<0$, then $X_0$ may become $-X_0$; $Y_0$ may become $-Y_0$; and $Z_0$ may be equal to π. If $Y_0>0$, then $Z_0$ may become $-Z_0$. The value of μ(n) may be sign($Y_n$).

The magnitude component of the vector {mag, Φ} may be equal to the outputted value $X_N$ multiplied by a gain factor K. The outputted value of $X_N$ may thus be passed through gain filter 312 to produce a value representing the magnitude information for the electromagnetic wave. For each iteration, n, from 0 to N−1, the gain, K, may be represented by equation 3 below:

$$K = \prod_{n=0}^{N-1} \cos\left[\arctan\left(\frac{1}{2^n}\right)\right] \quad \text{Eq. 3}$$

The outputted value $Z_N$, which is the value of Φ in this example, may be used as an index to obtain cos(Φ) and sin(Φ) values of the phase component of the electromagnetic wave from a sine lookup table 314.

While the physical implementation of these components is not limited, they may comprise the use of ASIC's or FPGA's. The configuration of these integrated components for performing CORDIC functions generally is known to those of ordinary skill in the art and will not be further elaborated upon here.

Figure 3B:
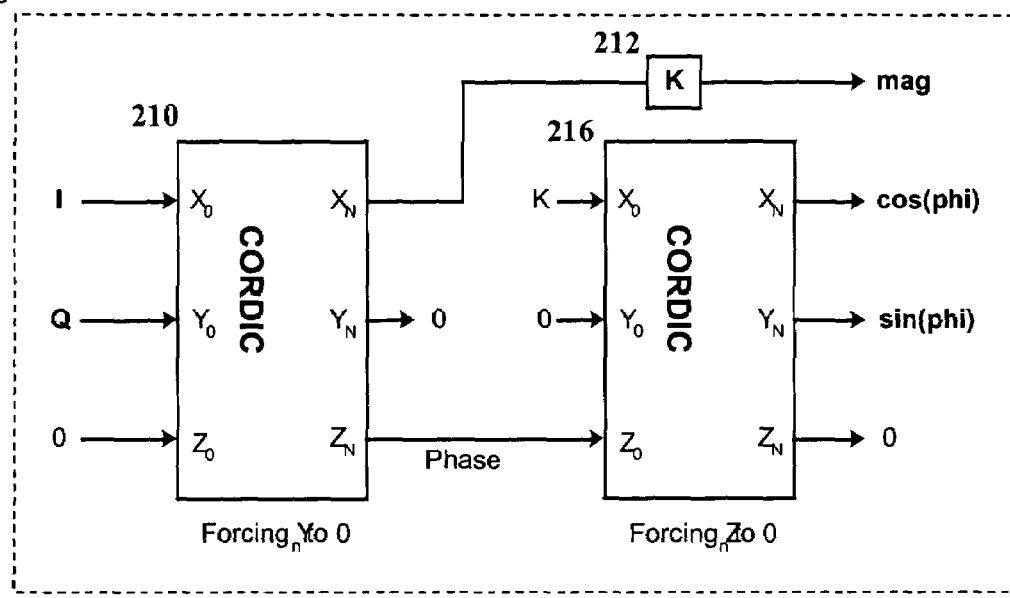

Another embodiment is illustrated in FIG. 3(b). In this embodiment, a second signal processor 316 and CORDIC processing module 316 may be used. The two cascaded CORDIC modules may be used to convert {I, Q} to {mag, cos(Φ), sin(Φ)}. Processor 310 may be used to convert {I, Q} to {mag, Φ} by forcing $Y_N$ to zero, in the manner previously described. Logic processor 316 may then be used to convert {mag, Φ} to {mag, cos(Φ), sin(Φ)} by forcing $Z_N$ to zero. In order to convert {mag, Φ} to {mag, cos(Φ), sin(Φ)}, the value of $X_0$ may be set to K, $Y_0$ to 0, and $Z_0$ to Φ as shown in FIG. 3(b). The value of the sign variable, μ(n), may be −sign($Z_n$). Cos(Φ) is then equal to $X_N$ and sin(Φ)= $Y_N$. Thus, no lookup table is needed in this method. However, the phase {Φ} needs to be calculated.

Figure 3C:
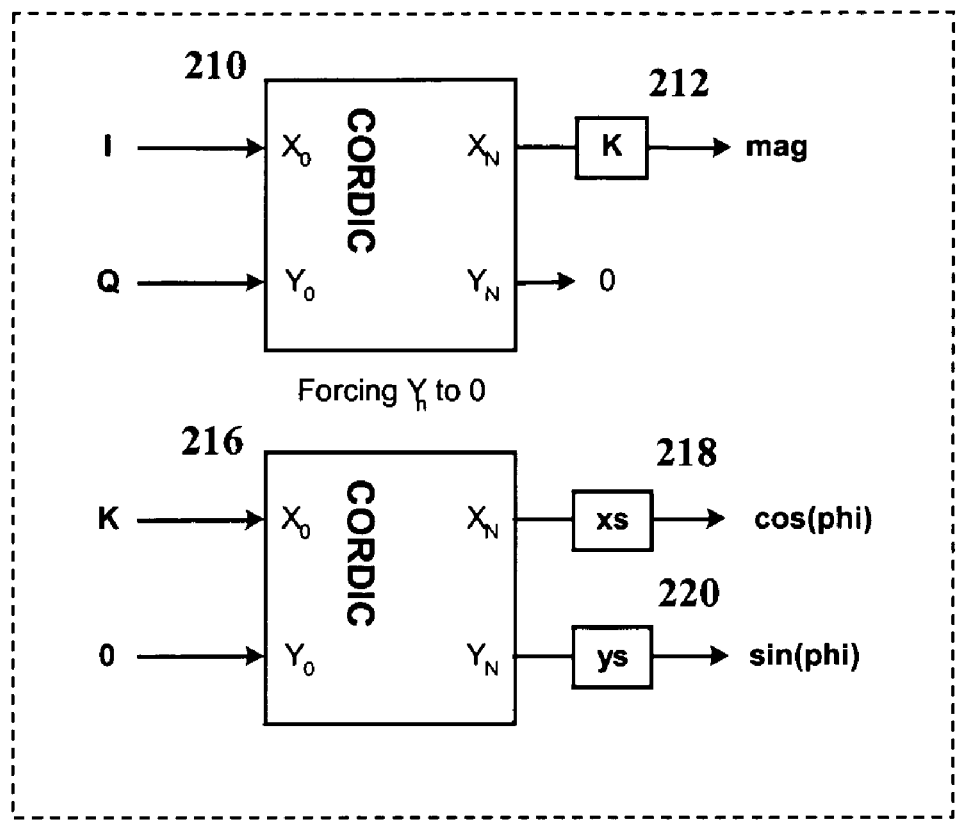

In another embodiment, shown in FIG. 3(c), a CORDIC algorithm may be used to convert the I,Q data directly to the polar form {mag, cos(Φ), sin(Φ)} using shift and add/subtract operations only. This algorithm does not need a lookup table, or a second CORDIC processing module. In addition, the computation of phase (Φ) is not required. In this implementation, the iterations conducted by the CORDIC algorithm may be represented by equations 4 and 5 below:

$$\begin{bmatrix} X_{n+1} \\ Y_{n+1} \end{bmatrix} = \begin{bmatrix} 1 & \mu(n)2^{-n} \\ -\mu(n)2^{-n} & 1 \end{bmatrix} \begin{bmatrix} X_n \\ Y_n \end{bmatrix} \quad \text{Eq. 4}$$

$$\begin{bmatrix} C_{n+1} \\ S_{n+1} \end{bmatrix} = \begin{bmatrix} 1 & -\mu(n)2^{-n} \\ \mu(n)2^{-n} & 1 \end{bmatrix} \begin{bmatrix} C_n \\ S_n \end{bmatrix} \quad \text{Eq. 5}$$

This direct CORDIC algorithm for the polar conversion may include a preprocessing stage that maps the I, Q data to the right hand plane, which avoids any phase ambiguity. This preprocessing may be represented by equations 6 through 8 below:

$$xs = \text{sign}(I), \, ys = \text{sign}(Q) \quad \text{Eq. 6}$$

$$X_0 = abs(I); \, Y_0 = abs(Q) \quad \text{Eq. 7}$$

$$C_0 = K; \, S_0 = 0 \quad \text{Eq. 8}$$

As shown in FIG. 3(c), inputs $X_0$ and $Y_0$ to logic processor 210 are set to the values of I and Q, respectively. The value of the scaled magnitude component of the polar vector may again be equal to $X_N \times K$. Thus, the output value $X_N$ may be passed through gain filter 312 to calculate the magnitude component of the electromagnetic wave. The output value $Y_N$ may be forced to 0.

Inputs $X_0$ and $Y_0$ to logic processor 316 may be set to the value of K and 0, respectively. In order to calculate the value of cos( ), the output value $X_N$ may then be passed through filter 318, where is multiplied by xs. Similarly, to calculate sin(Φ), output value $Y_N$ may be passed through filter 320, where it is multiplied by ys.

As may be seen, a direct CORDIC algorithm makes ASIC/FPGA polar conversion design very efficient. No RAM lookup table is needed. Even the calculation of the phase value is not required. Moreover, the signal latency is the equivalent to a conventional CORDIC algorithm.

In one embodiment, these characteristic signals of the original input wave may be modulated as digital pulses comprising a digital word quantized into bits B1 to Bn, with a Most Significant Bit ("MSB") to Least Significant Bit ("LSB"). The digital word may be of varying lengths in various embodiments. In general, the longer the word the greater the accuracy of reproduction of the input wave by the system (i.e, its resolution). Of course, in other embodiments, a differently composed digital word or an analog signal may be used.

The signals representing the input wave may then be transmitted through separate paths or channels to amplifier system 120. For example, the data signals may be passed from baseband processor 115 to a signal processor 118. Signal processor 118 may include, for example, filter 212 for filtering out unwanted frequency components to perform shaping of the signal pulses. In one embodiment, filter 212 may use polyphase filter banks that have a configurable number of taps and programmable filter coefficients to support different digital modulation schemes, although not limited thereto. For example, filter 212 may comprise a low-pass filter, such as a finite impulse response (FIR) or an infinite impulse response (IIR) filter. In another embodiment, filter 212 may comprise a low-pass filter bank, which is comprised of a series of filters $F_0$ to $F_{n-1}$. The impulse responses of filters $F_0$ to $F_{n-1}$ may be at $h_0(t)$ to $h_{n-1}(t)$ respectively. Alternatively, one impulse response h(t) may be determined based upon the output to be produced at amplifier 120 that is applied to each of the signal bits.

The signals representing the input wave may then be passed through a digital correction system 216 to reduce nonlinearities, such as bowing due to AM/PM distortion, in the resulting signal outputted from amplifier 120. Of course, those of ordinary skill in the art will appreciate that one or more correction circuits may be used.

Digital correction system 216 may comprise, for example, one or more digital signal processors (that may or may not be part of baseband processor 115 also) that contains an algorithm that uses a look-up table (LUT) containing values based upon a linear approximation of the output from amplifier 120 to correct the signals representing the input wave (e.g., R, sin(Φ), and cos(Φ) component signals) to help maintain the linearity of the output signal from power amplifier 120.

In one embodiment, for example, the N-bit values of the magnitude data signal, R, may be translated into new N-bit values that will linearize the output from power amplifier 120 closer to its desired values. In such a system, a correction table may comprise entries for each possible bit value. However, those of ordinary skill in the art will appreciate that the actual number of entries may be reduced depending on the characteristics of amplifier 120. The better the characteristics of amplifier 120, the less phase distortion per state, and the more entries that may be segmented into a smaller number of entries.

Digital correction system 216 may be used to make fine phase and amplitude corrections to the carrier wave signal via phase-locked loop (PLL) 226 and gain pre-stage 230 of carrier wave source 110. Correction signals may be computed by digital correction system 216, for example, based upon the data signals that it receives, and passed to PLL 226 and gain pre-stage 230. In this embodiment, small phase and amplitude corrections may be made to the reference source ($f_{ref}$) from an oscillator 246 for the carrier wave ($f_{carrier}$) in PLL 226 and to gain pre-stage 230, as shown in FIG. 2. In the example shown in FIG. 2, $\theta_c$ is the determined correct phase of the signal, $\theta_{ic}$ is the incorrect measured phase and the difference $\theta_c - \theta_{ic}$ is the amount of the correction that may be applied to PLL 226. Similarly, in this example, $r_c$ is the correct magnitude for the signal, $r_{ic}$ is the incorrect measured magnitude and the ratio $r_c/r_{ic}$ is the correction amount that may be applied to the carrier wave at gain pre-stage 230.

Correcting the states of each of the data signals has significant benefits, including a greater degree of control as compared with other modulation systems, such as conventional polar based phase modulation schemes. Moreover, in the described embodiment, the output signals may be linearized as close as possible to the desired output values, and only small amplitude and phase corrections need to be made to the carrier signal. In contrast, in conventional polar based modulation, for example, digital baseband correction is typically one-dimensional, being applied to the amplitude aspect of the input wave, and all of the phase correction must be done in the PLL of a phase modulator. This results in a greater sensitivity of polar based systems to phase error, particularly at higher sampling rates.

In the illustrated embodiment, the sin(Φ) signal component may be passed to a mixer 232 in modulator 114, where it may be modulated onto a carrier wave produced by oscillator 246 and PLL 226 in carrier wave source 110. Carrier wave oscillator 246 may be any source of electromagnetic waves that is capable of producing a signal wave, such as a voltage-controlled oscillator (VCO). In another embodiment this signal source may be a TCXO. Similarly, the cos(Φ) signal component may be inputted to a mixer 236 within modulator 114.

The modulated wave outputted from mixers 232 and 236 may each have a substantially constant envelope, i.e., they have no amplitude variations, yet have characteristics of the original input wave. Because one data signal is in quadrature with the other, the carrier wave may be phase shifted by ninety degrees using phase shifter 234. Phase shifter 234 may comprise any mechanism capable of shifting the phase of the carrier signal wave, such as through the use of delay lines, waveguide elements, microstrips, etc.

Those of ordinary skill in the art will appreciate that modulator 114 is not limited to the embodiment disclosed herein, but may comprise any circuitry and/or components capable of producing one or more modulated carrier wave signals based upon the inputting of a carrier wave and an aspects of two or more signals that represent the input wave.

In one embodiment, a full Ts-Hold sample and hold mechanism may be used to generate an output signal from amplifier 120. In this example, amplifier 120 may include a plurality of segments 240, the outputs from which may be controlled by the magnitude portion of the data signals. In one embodiment, amplifier 120 may include N segments for the N bits of each of the data signals. In some embodiments the regulation may be of the bias current to transistor segments, as is described further below, and so the control component may be referred to as a bias control circuit, and a number of them as a bias network. In some embodiments, it may be desired to statically or dynamically allocate one or more control circuits to one or more segments. Each of the amplifying segments may act as a current source, although, in other embodiments, other sources of other wave characteristics may be used, as well as other regulation schemes. The amplifying segments may be switched on and off by bits of the digital word output from the magnitude signal and so regulated thereby.

Figure 4A:
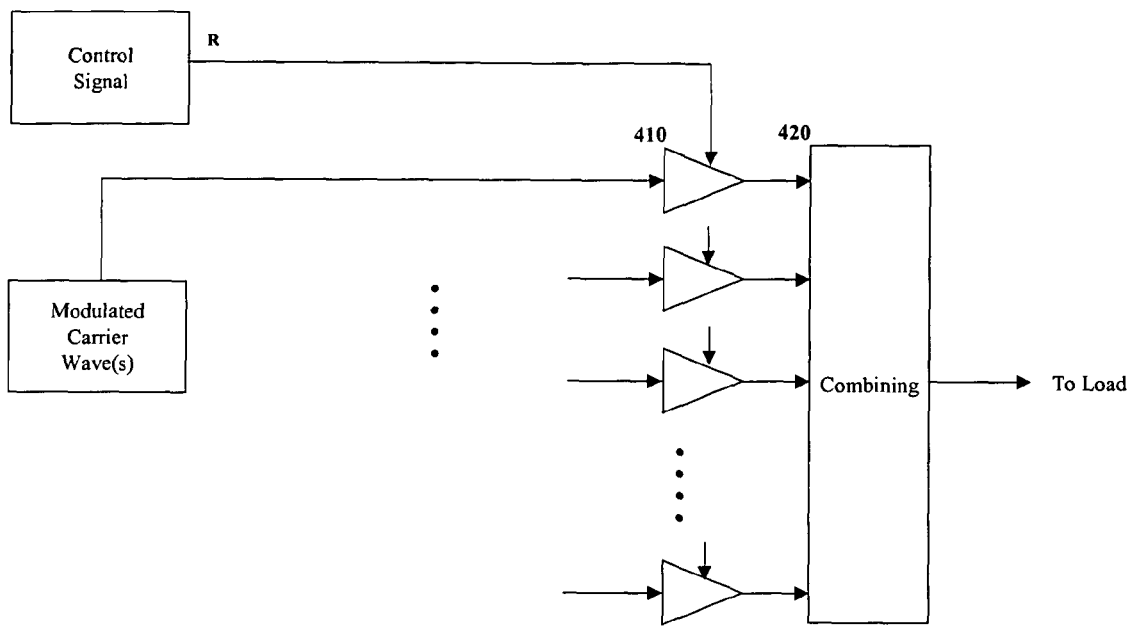
FIGS. 4(a)-(b) show an embodiment of amplifying segments.
Figure 4B:
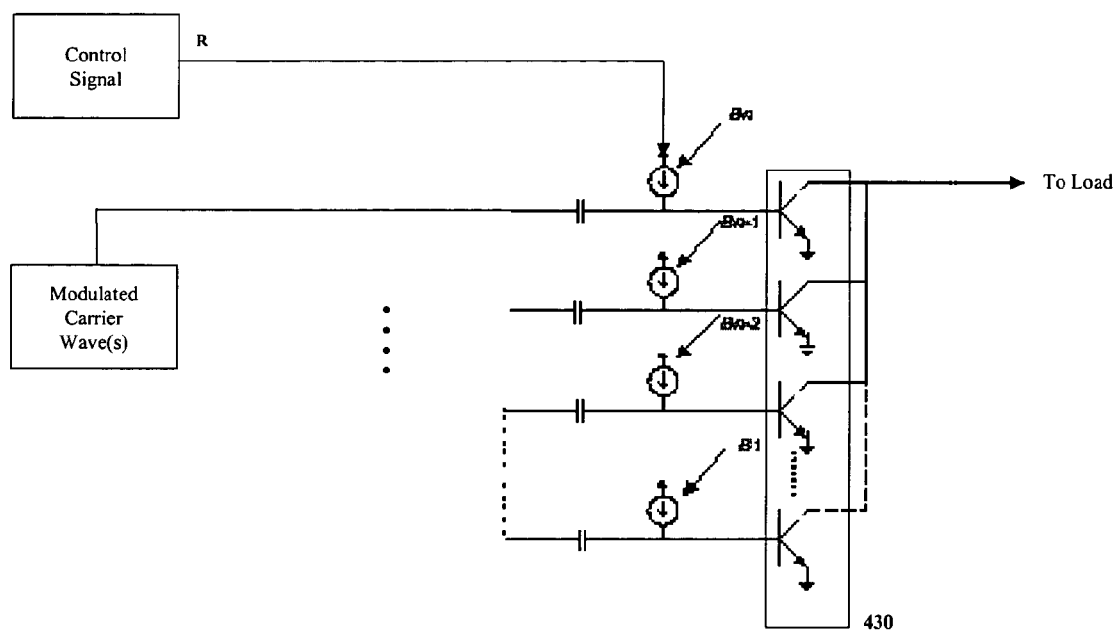

An embodiment of the amplifying segments of amplifier 120 are further illustrated in FIGS. 4(a)-(b). As shown in FIG. 4(a), the amplifier may include power amplifying segments 410. These may comprise, for example, power amplifiers, although not limited thereto. Each of the power amplifying segments may or may not produce an output depending on the control signal received by it. The modulated carrier wave(s) from modulator 114 (FIG. 2) may be inputted into each segment.

The output of each power amplifying segment may then be combined in combining circuit 420, creating an output signal to drive the load. Combining circuit 420 is not particularly limited, and may comprise any mechanism for combining the output from each power amplifier, such as by using power transformers, quarter-wave transmission lines, discrete LC components (e.g., Pi-networks), and the like.

As shown in FIG. 4(b), the amplifier may also contain segmented transistor 430, segment of which may serve as a potential current source. Each amplifying segment may or may not act as a current source, because it is regulated via the appropriate digital signal for regulating that control component, and activation of a segment is dependant upon the value of the control signal, and concomitant regulation of the appropriate control component.

The transistors and their segments may be an HBT transistor. Other transistors may be used as well, such as FET, etc., as well as other current or wave characteristic sources. Other components may be interposed as well, e.g., a driver before transistor 430, a VGA to reduce the drive current to the transistor segments, etc.

In the various embodiment, each of the amplifying segments Bn-B1 (or power amplifying segments 410) may contribute an output to the output signal. The amplifying segments may be switched on and off by bits of the digital word output from the magnitude signal from the input wave and so regulated thereby. For example, if a bit is "1" or "on," the corresponding control component may be switched on, and so an output from that segment is contributed to the load. Of course, the length of the digital word may vary, and so the number of bits and control segments may vary accordingly in various embodiments. Additionally, embodiments may comprise a single bit length word.

In one embodiment, each of the amplifying segments may vary in size. For example, if the overall gain of the amplifier is to be "A", one segment may be twice the size of the next segment, which in turn may be twice the size of the next segment, and so on until reaching the final segment, so that the sum of the gain from all of the segments is equal to A. The largest segment may be controlled by the MSB for the magnitude signal, the next bit to the next largest segment, etc., until the LSB, which is sent to the smallest segment. Of course, as had been noted above, other embodiments may have a different pattern of matching signal to segment. In other embodiments, other wave characteristics may be fed to another source of wave characteristics and so regulate that source.

Thus, a portion of the signals that represent the input wave, such as the magnitude portion, may be used to actuate individual amplifying segments within amplifier 120 to amplify a carrier signal modulated in relation to the original input wave. This produces an output current from amplifier 120 that represents an amplified carrier wave carrying the intelligence contained within the input wave.

While the invention has been described herein in regard to a transmitter, those of ordinary skill in the art will appreciate that the invention is not limited thereto and that other processing systems may be used as well. In some embodiments, a transmitter, receiver, and/or transceiver processing system of the invention may be specialized for particular input signals, carrier waves and output signals, e.g. various types of cell phones, such as CDMA, CDMA2000, W-CDMA, GSM, TDMA, as well as various other types of devices, both wired and wireless, e.g. Bluetooth, 802.11a, -b, -g, GPS, radar, 1×RTT, radios, GPRS, computers and computer communication devices, handheld devices, etc. Among the modulation schemes supported by the invention are: GMSK, which is used in GSM; GFSK, which is used in DECT & Bluetooth; 8-PSK, which is used in EDGE, OQPSK & HPSK, which are used in IS-2000; p/4 DQPSK, which is used in TDMA; and OFDM, which is used in 802.11.

The preferred embodiments utilize both analog and digital components insofar as these embodiments manipulate waves and signals requiring both. For example, cell phone embodiments may utilize both analog and digital components. Various types of system architectures may be utilized for constructing the embodiments. Generally an ASIC composition is used in realizing the various architectures. CMOS and/or BiCMOS fabrication techniques may be used as well as a combination of both, e.g. a BiCMOS Phase modulator area combined with a CMOS baseband area. Generally, in the preferred embodiments, transistor speed is a concern, and BiCMOS provides faster speed. Additionally, BiCMOS provides less current drain than an all CMOS configuration.

The invention improves over the systems of the prior art. The transmitter of the invention does not include I/Q modulators, but instead preferably uses a polar modulation system. Conventionally, I/Q modulators have been used with linear modulation schemes. Not using such modulators eliminates the problem of I/Q imbalance that occurs when these modulators are used.

In addition, any transmission noise present in the receive band will be may be minimized by the appropriate designation of the loop filter and VCO in wideband phase modulator. As such, unlike the conventional I/Q modulator approaches, the level of transmit noise emissions in the receive channel does not mandate the use of SAW filters.

Power control is accomplished by varying the input power level to the power amplifier via a voltage-controlled attenuator, along with the base bias voltages on the buffer and amplitude modulator stages. The amplitude modulation function is performed at the final stage in the transmit line-up. This allows for a very efficient solution for the overall transmitter as the modulated RF carrier signal applied to all gain blocks of the transmitter will be constant envelope.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for processing an electromagnetic wave comprising the steps of:
   receiving rectangular coordinate information for said electromagnetic wave; and
   directly converting said rectangular coordinate information into a magnitude signal, a $\sin(\Phi)$, and a $\cos(\Phi)$ signal using a CORDIC algorithm employing shift and add/subtract operations, where $\Phi$ represents a phase of said electromagnetic wave.

2. A method as in claim 1, wherein said shift and add/subtract operations are accomplished using a processor employing said CORDIC algorithm.

3. A method as in claim 1, wherein said step of direct converting includes a preprocessing stage that maps said rectangular coordinate information to a right hand plane of a coordinate map to avoid any phase ambiguity prior to said shift and add/subtract operations.

4. A method as in claim 3, wherein said magnitude signal, said $\sin(\Phi)$ signal and said $\cos(\Phi)$ signal are generated in accordance with the equations:

$$\begin{bmatrix} X_{n+1} \\ Y_{n+1} \end{bmatrix} = \begin{bmatrix} 1 & \mu(n)2^{-n} \\ -\mu(n)2^{-n} & 1 \end{bmatrix} \begin{bmatrix} X_n \\ Y_n \end{bmatrix} \text{ and}$$

-continued $$\begin{bmatrix} C_{n+1} \\ S_{n+1} \end{bmatrix} = \begin{bmatrix} 1 & -\mu(n)2^{-n} \\ \mu(n)2^{-n} & 1 \end{bmatrix} \begin{bmatrix} C_n \\ S_n \end{bmatrix}$$

where the number of iterations, n, varies from 0 to N−1;
wherein $X_0$ is set to an in-phase component value of said electromagnetic wave, $Y_0$ is set to a quadrature component value of said electromagnetic wave, $C_0$ is set to a constant gain value K, $S_0$ is set to 0, and μ(n) is the sign of the electromagnetic wave and wherein said magnitude equals $X_N$ multiplied by said constant value K and $Y_N$ equals 0;
wherein $X_0$ is then set to said constant value K and $Y_0$ is set to 0; and
wherein said cos(Φ) equals $X_N$ multiplied by the sign of said in-phase component value and sin(Φ) equals $Y_N$ multiplied by the sign of said quadrature component value.

5. An electromagnetic wave processor programmed to receive rectangular coordinate information for an electromagnetic wave, and to directly convert said rectangular coordinate information into a magnitude signal, a sin(Φ), and a cos(Φ) signal using a CORDIC algorithm employing shift and add/subtract operations, where Φ represents a phase of said input signal.

6. A processor as in claim 5, wherein said processor is programmed to map said rectangular coordinate information to a right hand plane of a coordinate map to avoid any phase ambiguity prior to said shift and add/subtract operations.

7. A processor as in claim 5, wherein said magnitude signal, said sin(Φ) signal and said cos(Φ) signal are generated in accordance with the equations:

$$\begin{bmatrix} X_{n+1} \\ Y_{n+1} \end{bmatrix} = \begin{bmatrix} 1 & \mu(n)2^{-n} \\ -\mu(n)2^{-n} & 1 \end{bmatrix} \begin{bmatrix} X_n \\ Y_n \end{bmatrix} \text{ and}$$

$$\begin{bmatrix} C_{n+1} \\ S_{n+1} \end{bmatrix} = \begin{bmatrix} 1 & -\mu(n)2^{-n} \\ \mu(n)2^{-n} & 1 \end{bmatrix} \begin{bmatrix} C_n \\ S_n \end{bmatrix}$$

where the number of iterations, n, varies from 0 to N−1;
wherein $X_0$ is set to an in-phase component value of said electromagnetic wave, $Y_0$ is set to a quadrature component value of said electromagnetic wave, $C_0$ is set to a constant gain value K, $S_0$ is set to 0, and μ(n) is the sign of the electromagnetic wave and wherein said magnitude equals $X_N$ multiplied by said constant value K and $Y_N$ equals 0;
wherein $X_0$ is then set to said constant value K and $Y_0$ is set to 0; and
wherein said cos(Φ) equals $X_N$ multiplied by the sign of said in-phase component value and sin(Φ) equals $Y_N$ multiplied by the sign of said quadrature component value.

8. A method for processing of an input wave comprising the steps of:
receiving quadrature information that represents said input wave when combined;
using a CORDIC algorithm employing shift and add/subtract operations to directly convert said quadrature information into a magnitude signal, a sin(Φ), and a cos(Φ) signal, where Φ represents a phase of said input signal;
generating at least one modified signal using at least one of said sin(Φ) signal and/or said cos(Φ) signal; and
regulating said modified signal using said magnitude signal to generate an output signal.

9. A method as in claim 8, wherein said step of direct converting includes a preprocessing stage that maps said rectangular coordinate information to a right hand plane of a coordinate map to avoid any phase ambiguity prior to said shift and add/subtract operations.

10. A method as in claim 8, wherein said step of regulating said modified signal is performed using a plurality of segments.

11. A method as in claim 10, wherein one or more of said segments is independently controlled as a power amplifier to contribute power to an output signal.

12. A method as in claim 11, wherein said power is contributed to said output signal by using one or more selected from the group consisting of power transformers, quarter-wave transmission lines, discrete LC components, and a Pi-networks.

13. A method as in claim 10, wherein one or more of said segments is independently controlled as a current source to contribute current to an output signal.

14. An apparatus for processing of an input wave comprising the steps of:
a processor programmed for receiving quadrature information that represents said input wave when combined, and for using a CORDIC algorithm that uses shift and add/subtract operations to directly convert said quadrature information into a magnitude signal, a sin(Φ), and a cos(Φ) signal, where Φ represents a phase of said input signal;
a signal generator for generating at least one modified signal using at least one of said sin(Φ) signal and/or said cos(Φ) signal; and
an output signal generator for receiving said modified signal and using said magnitude signal to generate an output signal.

15. An apparatus as in claim 14, wherein said processor is programmed to map said rectangular coordinate information to a right hand plane of a coordinate map to avoid any phase ambiguity prior to said shift and add/subtract operations.

16. An apparatus as in claim 14, wherein said magnitude signal, said sin(Φ) signal and said cos(Φ) signal are generated in accordance with the equations:

$$\begin{bmatrix} X_{n+1} \\ Y_{n+1} \end{bmatrix} = \begin{bmatrix} 1 & \mu(n)2^{-n} \\ -\mu(n)2^{-n} & 1 \end{bmatrix} \begin{bmatrix} X_n \\ Y_n \end{bmatrix} \text{ and}$$

$$\begin{bmatrix} C_{n+1} \\ S_{n+1} \end{bmatrix} = \begin{bmatrix} 1 & -\mu(n)2^{-n} \\ \mu(n)2^{-n} & 1 \end{bmatrix} \begin{bmatrix} C_n \\ S_n \end{bmatrix}$$

where the number of iterations, n, varies from 0 to N−1;
wherein $X_0$ is set to an in-phase component value of said electromagnetic wave, $Y_0$ is set to a quadrature component value of said electromagnetic wave, $C_0$ is set to a constant gain value K, $S_0$ is set to 0, and μ(n) is the sign of the electromagnetic wave and wherein said magnitude equals $X_N$ multiplied by said constant value K and $Y_N$ equals 0;

wherein $X_0$ is then set to said constant value K and $Y_0$ is set to 0; and wherein said $\cos(\Phi)$ equals $X_N$ multiplied by the sign of said in-phase component value and $\sin(\Phi)$ equals $Y_N$ multiplied by the sign of said quadrature component value.

17. An apparatus as in claim 14, wherein said output signal generator comprises plurality of segments.

18. An apparatus as in claim 17, wherein one or more of said segments is independently controlled as a power amplifier to contribute power to an output signal.

19. An apparatus as in claim 18, wherein said power is contributed to said output signal by using one or more selected from the group consisting of power transformers, quarter-wave transmission lines, discrete LC components, and a Pi-networks.

20. An apparatus as in claim 17, wherein one or more of said segments is independently controlled as a current source to contribute current to an output signal.

* * * * *